June 11, 1940.

H. KATTWINKEL 2,204,499

CLUTCH DEVICE

Filed Sept. 27, 1938

4 Sheets-Sheet 1

Inventor,
H. Kattwinkel

By Glascock Downing & Seebold
Attorneys.

June 11, 1940.   H. KATTWINKEL   2,204,499
CLUTCH DEVICE
Filed Sept. 27, 1938   4 Sheets-Sheet 2

June 11, 1940.  H. KATTWINKEL  2,204,499
CLUTCH DEVICE
Filed Sept. 27, 1938  4 Sheets-Sheet 3

Inventor,
H. Kattwinkel
By Glascock Downing & Seebold
Attorneys.

June 11, 1940. H. KATTWINKEL 2,204,499
CLUTCH DEVICE
Filed Sept. 27, 1938 4 Sheets-Sheet 4

UNITED STATES PATENT OFFICE 2,204,499

CLUTCH DEVICE

Hans Kattwinkel, Radebeul, Germany

Application September 27, 1938, Serial No. 231,992
In Germany September 30, 1937

10 Claims. (Cl. 192—48)

My invention relates to improvements in clutch devices as described in my prior Patent No. 2,137,977, which consist of the combination of a laminated disc clutch (main or travelling clutch) with a supplementary clutch preferably constructed as a single-disc friction clutch, by the aid of which one of the disc carriers of the travelling clutch, which is rotatably supported in relation to both the shafts to be coupled together, can be coupled to the associated shaft.

Figure 1:
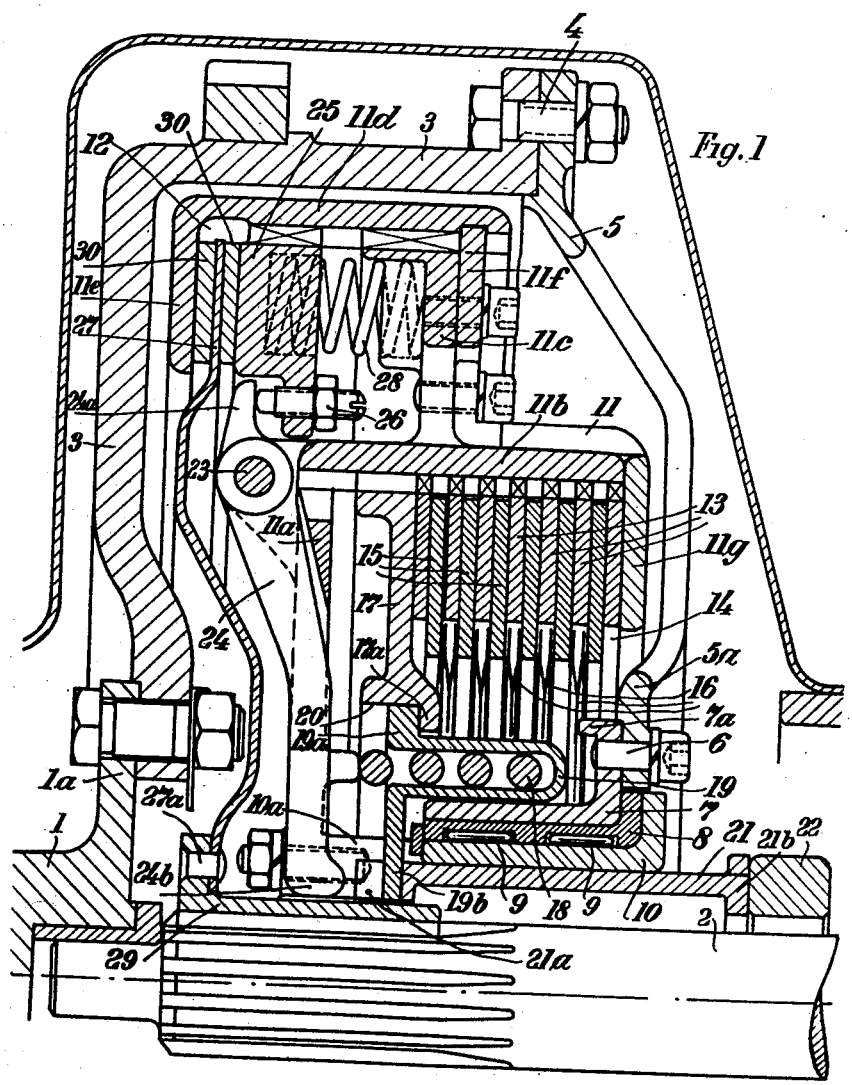
Figure 2:
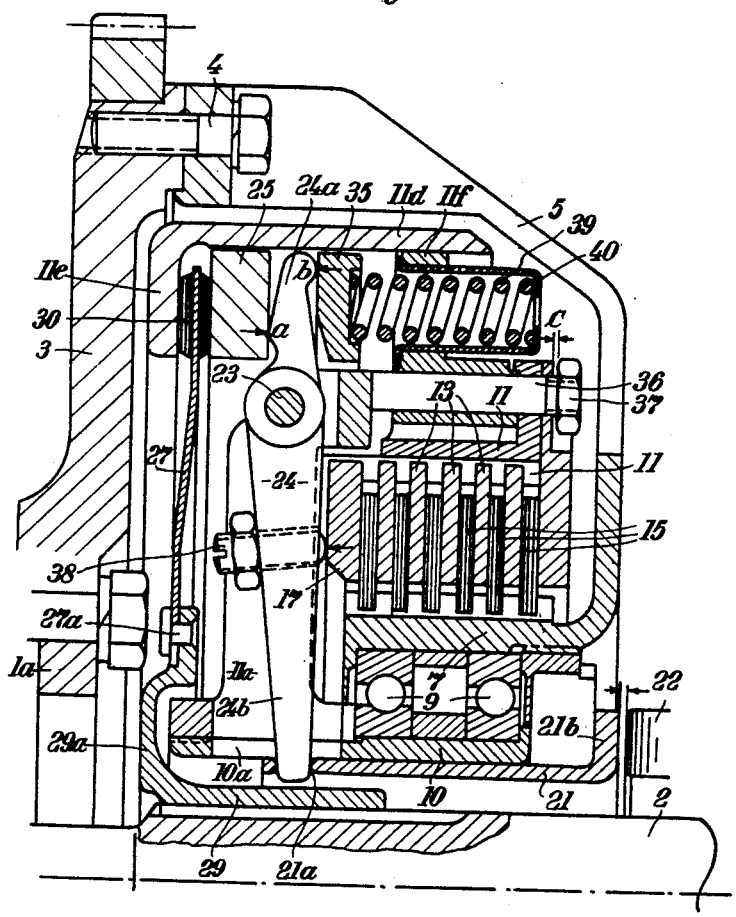
Figure 2A:
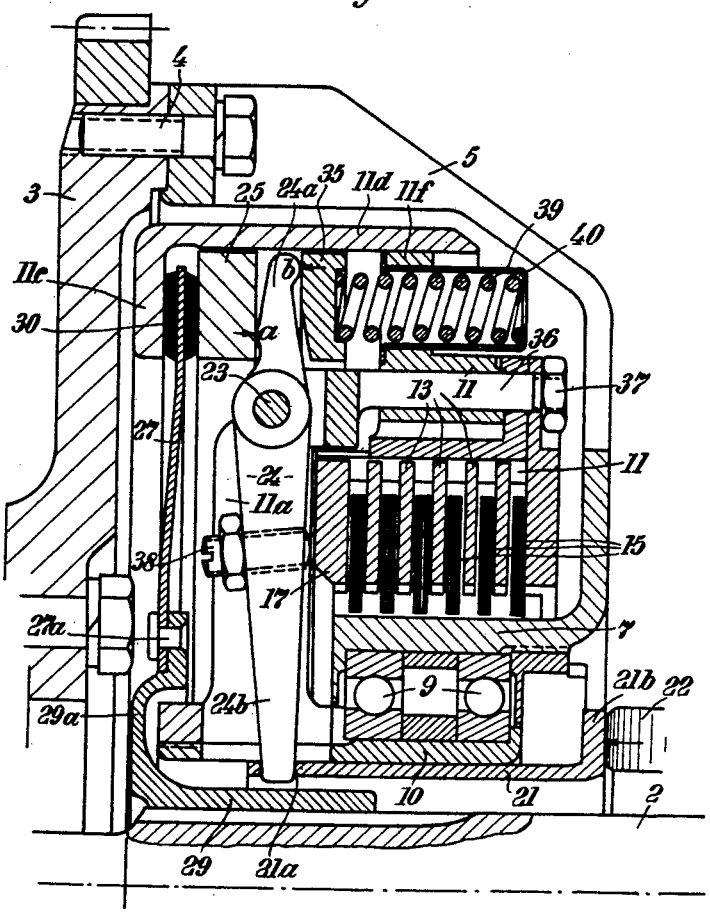
Figure 2B:
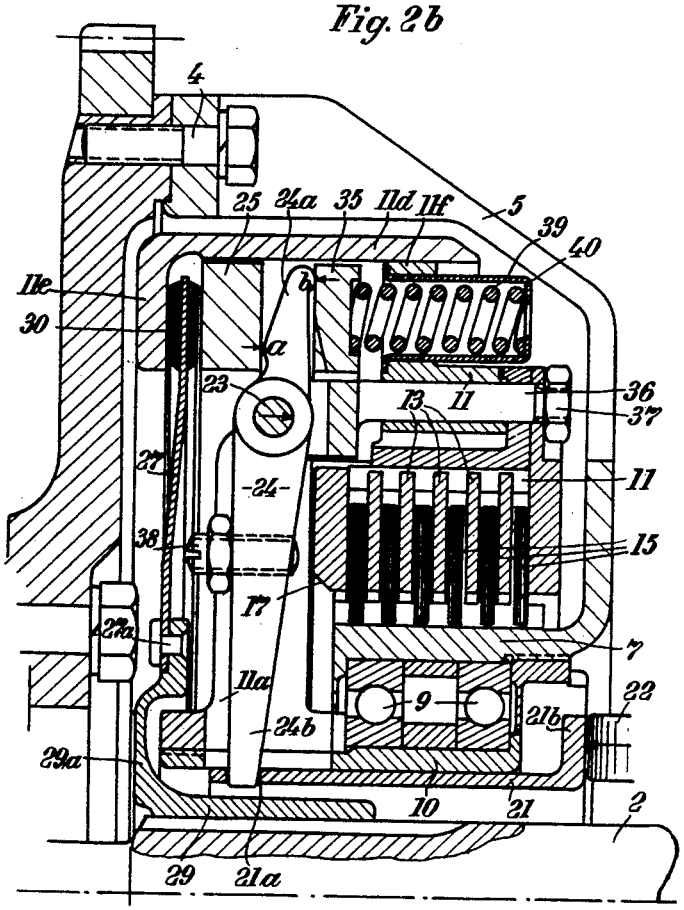

My invention is illustrated by way of example in two embodiments in the accompanying drawings, in which Figure 1 shows in axial section through the upper halves of the clutch a construction with separate spring systems for the travelling clutch and for the supplementary clutch; and Figures 2, 2a and 2b are similar views of a construction with only one set of springs, these three views showing the same clutch in three different operative positions.

In Figure 1, 1 denotes the shaft coming from the engine, and 2 the shaft leading to the gear. To one flange 1a on the engine shaft is bolted a flywheel disc 3, which forms a pot-shaped casing, which, together with an apertured cover 5 closing the open side of the casing and screwed to it at 4, encloses the clutch itself. To a flange-like portion 5a of the cover 5 is secured with screws at 6 a sleeve-like hub member 7, into which a bush 8, with needle bearings 9, is inserted endwise. This bush serves for guiding and supporting the sleeve-like hub member 10 of an annular body 11, which is composed of a radially extending disc 11a, a cylindrical portion 11b, a flange member 11c mounted on the latter, and a cylinder member 11d connected with this flange member, this cylinder member having in its turn two inwardly directed flanges 11e and 11f. The connecting of the member 11d, which contains the abutments for the supplementary clutch 12, with the part 11b, which serves as carrier for the outer discs 13 of the laminated disc clutch 14, is effected by securing the flange member 11f to the flange 11c with screws. The annular body, denoted as a whole by 11, which will hereinafter be referred to in general as the loose disc carrier, is rotatably supported, without being axially displaceable, by means of its hub member 10 in the bush 8, which in its turn is rigidly connected through the hub member 7 and the cover 5 with the flywheel 3, and thereby with the engine shaft 1. The laminated discs 13 are as usual axially slidable by the aid of teeth provided on the outer periphery, in corresponding grooves in the loose disc carrier 11, but are not rotatable relatively thereto. The carrier or driver for the inner laminated discs 15 is formed by a suitable number of annular discs 16 of spring sheet metal, which are welded together in pairs by their inner margins, and are welded to the corresponding discs 15 by their outer margins. The connection with the associated shaft, that is, the engine shaft 1, is effected in the case illustrated by welding or screwing the right-hand pair of spring rings 16 to an inwardly projecting extension 7a on the hub member 7, which is secured with screws to the cover 5. The group of discs of the travelling clutch 14 is pressed together by the aid of a pressure plate 17, which is axially displaceable but not rotatable on the cylinder portion 11b of the loose disc carrier 11 in the same manner as the discs 13.

The strong helical spring 18 serving for pressing the pressure plate against the group of discs 20 held by an abutment flange 11g bears with its left-hand end on an annular projection on the member 11a of the loose disc carrier, while with its other end it bears against the bottom of the cylindrical cavity that receives it in an annular body 19, which engages with a flange member 19a in an annular recess 20 in the pressure plate 17, and bears, under the pressure of the spring 18, against a projection 17a on the pressure plate. The annular body 19 is not rotatable but is axially guided by the aid of teeth 19b, directed radially inwards, which engage in corresponding gaps 10a in the hub member 10. The teeth 19b engage in recesses 21a in a bush 21, which is rotatably supported inside the hub member 10, but is non-rotatably guided in relation to this member, and therefore in relation to the loose disc carrier 11. By the right-hand flange-like end 21b of the bush 21 a pressure ring 22 can come into engagement, which is subject to the action of the clutch pedal of the vehicle on which the clutch is mounted, in such a way that when the pedal is depressed, the pressure ring 22, which is preferably made of a special carbon known for such purposes or of some other suitable frictional material, is pressed towards the left against the sleeve 21, whereupon the latter takes the annular body 19 with it, and thereby sets free the pressure plate 17 against the action of the spring 18.

Within the range of movement of the left-hand end of the sleeve 21 lie the inner ends of levers 24 pivotally mounted at 23 on the loose disc carrier, the shorter outer ends 24a of these levers acting upon a pressure plate 25, axially displaceable in the cylinder member 11d but not rotatable, for the supplementary clutch 12, this action occurring through the medium of positioning screws 26, by means of which the axial distance between the lever ends 24a and the pressure plate 25, and therefore also the distance between the inner lever ends 24b and the adjacent end of the sleeve 21, can be regulated.

The pressing of the pressure plate 25 against the friction disc 27 of the supplementary clutch 12 is effected by the aid of a plurality of helical springs 28, distributed over the periphery, which bear with their other ends against the flange member 11c. The friction body 27, for which the flange member 11e serves as an abutment, is composed of a sheet-steel disc secured with screws at 27a to a bush 29, which is slidable but not rotatable upon the shaft 2, and of an annular disc 30, secured to the latter on both sides, of frictional material, for instance an impregnated asbestos material or the like.

This clutch operates in the following manner: In the normal position of the parts, which is illustrated in the drawings, and which corresponds to the closure of the clutch, the clutch sleeve 21 is located, since the clutch pedal is released, in the right-hand end position, in which it is held by the pressure spring 18 of the travelling clutch. The spring 18 acts at the same time upon the pressure plate 17, which in this way keeps the group of discs 13, 15 pressed together. The frictional parts of the supplementary clutch 12 are pressed together by their springs 28 acting upon the pressure plate 25. The positioning screws 26 are so adjusted that the inner ends of the levers 24 are at a certain distance from the left-hand end of the coupling sleeve 21.

If the clutch is now to be released, the driver steps upon the clutch pedal. The annular body 22 is thereby pressed against the flange 21b of the clutch sleeve 21 revolving with the group of discs, thereby giving rise to slight friction, which, as soon as the clutch is released, results in rapid braking of the light clutch members, which until then had been revolving at the speed of the engine shaft. Upon displacement of the coupling sleeve 21 towards the left, the annular body 19, with its teeth 19b projecting into the recesses 21a of the sleeve, is for the first time carried along, the spring 18 being compressed. The pressure plate 17 is then set free, so that the group of discs 13, 15 is relieved. Quite a slight displacement of the pressure plate is sufficient for this, since immediately after the relieving of the group of discs the clutch 12 is also opened. The opening of this clutch is effected owing to the fact that the coupling sleeve 21, after surmounting the space provided between its left-hand end and the lower end of the levers 24, which is adjustable by means of the screws 26, displaces the said lever arms towards the left, as a result of which the pressure plate 25 is moved to the right against the action of the springs 28. The friction disc 27 of the supplementary clutch is thereby also set free, so that it can swing freely with the gear wheel to be engaged, and there is no hindrance to the putting in of another speed, since on account of the rounding at the ends of the teeth to be engaged, the shaft yields under the engagement pressure, and the teeth readily mesh with one another.

Upon re-engagement of the clutch, in consequence of the displacement of the coupling sleeve 21 towards the right occasioned by the spring 18, the lower ends of the levers 24 are first released, so that the supplementary clutch 12 closes under the action of the springs 28. Then a short time later, the flange 19a of the annular body 19 enclosing the spring 18 comes into contact with the extension 17a of the pressure plate 17, which consequently again mounts under pressure upon the group of discs of the travelling clutch, and thereby effects the engagement thereof.

The closing of the supplementary clutch is therefore effected before the closing of the travelling clutch, and even before any pressure at all is exerted upon the pressure plate 17 of the latter. The supplementary clutch is therefore never exposed to friction for any length of time, which might lead to appreciable wear and evolution of heat, because it only has to hold the light loose disc carrier, which is partially braked. The material of the frictional surfaces of the supplementary clutch may therefore have a high co-efficient of friction. The specific application pressure of this clutch may also be made very high. The smooth engagement of the travelling clutch is further promoted by the fact that the specific loading of the friction material can be kept within the lowest limits by means of very large friction surfaces. The possibility is hereby given of employing very low co-efficients of friction with very low application pressure. The proportions of the supplementary clutch 12 are so selected that it is able to transmit a considerably higher torque, higher by at least 50 per cent., than the travelling clutch, since a slipping of the supplementary clutch must in all cases be prevented. This is easy to attain, because the loading of the clutch is always effected in a closed condition, and thus the static co-efficient of friction is to be taken into consideration.

The abovementioned braking of the loose disc carrier, with all the parts connected therewith, by applying pressure to the annular body 22 when uncoupling is of importance inasmuch as when closing the clutch, in which operation the supplementary clutch closes first, the relative speeds of the clutch members in question are equal to zero, or are at least very small, so that friction generating any heat and occasioning any wear is in practice avoided, as well as any disturbing shock.

In the form of construction illustrated in Figures 2, 2a and 2b, on to the flywheel 3 rigidly connected with the engine shaft of the vehicle on which the clutch is mounted, is flanged, by the aid of screw bolts 4, a bell-shaped apertured annular body 5, which may at the same time be constructed as a casing for the clutch device as a whole. The inner portion 7, shaped like a hub sleeve, of the annular body 5, is supported, by the aid of a two-row ball bearing 9, upon a sleeve 10, in which is inserted a muff 21, axially displaceable in relation thereto, with the flange 21a of which a coupling ring 22, actuated by the clutch pedal of the vehicle, can come into engagement. Upon the sleeve 10, by the aid of arms 11a extending radially outwards, is secured an annular body 11, which forms the carrier for the outer discs 13, which engage, in the usual manner, with toothed-wheel-like sectors provided on the outer periphery, in ledges provided on the disc carrier 11 and extending in an axial direction. The inner discs 15 are guided in a corresponding manner on ledges on the hub member 7 of the annular body 5, which hub member will hereinafter be described as the fixed disc carrier, while the annular body 11 carrying the outer discs 13, which is rotatable both in relation to the engine shaft and in relation to the shaft 2 to be driven, will be described as the loose disc carrier.

On the loose carrier 11 are supported at 23 a number of levers 24 distributed round the periphery. The supporting points are however not located directly on the disc carrier, but are mounted on bolts 36, which are guided by bores extending in an axial direction in the disc carrier 11, and are slidable through a small clearance space c, as shown in Figure 2. This clearance can be adjusted by the aid of a nut 37. The inner arms 24b of the clutch levers 24 engage in notches 21a out in the clutch muff, so that upon displacement of the latter they are carried along with it in an axial direction. By 38 is denoted a stop screw, which can be locked by means of a nut, and which is screwed into the central portion of the inner arm of the levers 24, and can come into engagement by its end with the pressure plate 17 of the disc clutch. This pressure plate, like the discs 13, is axially displaceable but not rotatable on the loose disc carrier 11. The outer arms 24a of the clutch levers 24 are located between two annular discs 25 and 35, the former of which forms the pressure plate for the supplementary clutch. The sheet-metal disc 27 of this clutch is secured at 27a to the flange 29a of a hub body 29, which is axially displaceable upon the driven shaft 2. The actual annular friction body 30 of the supplementary clutch is pressed by means of the pressure plate 25 against an abutment 11e, which forms an inwardly directed flange of an annular body 11d, which is connected by a flange member 11f with the loose disc carrier 11. The annular body 35 is pressed by a number of helical springs 39 distributed round the periphery towards the supplementary clutch. The springs bear with their other ends against the bottom of pots 40 enclosing them, which are secured to the flange member 11f. The outer arms 24a of the clutch levers can come into engagement at two positions located at a certain radial distance from one another on the one hand, namely internally at a, with the pressure plate 25, and on the other hand externally at b, with the annular body 35. The construction of the clutch levers and particularly of their outer arms, is such, and the axial clearance of the bolts 36 carrying the bearings 23 for the clutch levers in relation to the loose disc carrier 11, which moreover is so supported as not to be slidable in an axial direction as well as the distance between the adjusting screw 38 and the pressure plate 17 of the travelling clutch are so dimensioned, that upon actuation of the clutch pedal, whereby the muff 21 is displaced to the left, first the travelling clutch and then the supplementary clutch are opened, while the closure of these two clutches takes place in the reverse sequence.

The operations are then as follows: If the clutch is to be opened, the driver depresses the clutch pedal, as a result of which the coupling ring 22 slides out of the position illustrated in Figure 2 to the left, until it meets the flange of the muff 21. Upon further depression of the clutch pedal the muff 21 also slides to the left, the inner arms of the levers 24 being carried along with it. The point of contact a with the pressure plate 25 forms at first the fixed fulcrum while the bearing 23 slides towards the left and the outer end of the lever arm 24a towards the right, against the pressure of the springs 39. During this movement the pressure plate 17 of the travelling clutch is set free from the positioning screw 38 of the clutch levers 24, and the travelling clutch is therefore relieved of the pressure of the springs 39 hitherto bearing upon it. Upon the further displacement of the clutch muff 21 the nut 37 of the bolts 36 carrying the bearings 23 for the clutch levers, after elimination of the small clearance c (Fig. 2), bears against the loose disc carrier 11, so that now the bearings 23 become fulcrums for the levers 24, as shown in Figure 2a. Consequently the cams a of the outer lever arms 24a move away from the pressure plate 25 of the supplementary clutch, and thereby also set the latter free, while the cams b slide the pressure ring 35 further to the right (Fig. 2b) against the action of the springs 39. Both clutches are now released.

If the clutch is to be engaged, the driver gradually liberates the pedal. The consequence of this is that the springs 39 press the upper lever arms 24a to the left again until the cams a come into engagement with the pressure plate 25, whereupon firstly the supplementary clutch closes. Upon further relaxation of the clutch pedal, the inner arms 24b of the clutch levers are then pressed to the right, the points of contact of the cams a forming fulcrums, and the bearings 23 slide towards the right until the positioning screws 38 bear against the pressure plate 17 of the travelling clutch again, so that if the clutch muff 21 is now completely set free, the pressure of the springs 39 acts both upon the supplementary clutch and upon the travelling clutch and keeps them both closed.

It is also to be emphasized that by this new construction of the clutch, in the supplementary clutch constructed as a single-disc clutch, a particularly high application pressure is available. This is very desirable, because this clutch is only released during the gear-changing operation, but otherwise after engagement, that is, during the slipping of the laminated disc clutch, absolutely must be closed, in order to obviate with absolute certainty the friction that would cause wear on the supplementary clutch. Owing to the special arrangement and construction of the levers 24, and by appropriate selection of the length of the levers and of the ratio of the lever arms, with a given spring pressure, the pressure upon the single-disc clutch is greater than the spring pressure itself, while the pressure upon the laminated disc clutch is substantially less. This lower pressure is at once admissible, because the laminated disc clutch, in consequence of the large number of frictional surfaces, even with a low coefficient of friction (oil running for example, can readily transmit the maximum torque. Furthermore the lever construction described and illustrated yields the advantage that in consequence of the change of fulcrum upon opening the clutch, both clutches can be relieved or released with the exertion of comparatively little force on the pedal.

If both clutches are constructed for running dry it is under some circumstances possible to manufacture the frictional material of the single-disc clutch, since the latter only has to transmit with absolute certainty the maximum torque, including shocks, with a particularly high coefficient of friction. The other-wise injurious high specific stressing of the frictional substances of ordinary single-disc clutches in here completely absent, because this clutch, as already stated, does not have to furnish just frictional work. With the laminated disc clutch, however, It is desirable to select the coefficient of friction as low as is at all possible, in order to obtain the smallest possible specific stresses and therefore long life, smooth engagement, and so forth. By the multiplicity of the frictional surfaces a compensation is obtained for the low coefficient of friction, and if the single disc clutch is allowed to run dry, and the laminated disc clutch is allowed to run in an oil bath, the conditions that have just been described as desirable are at once obtained.

I claim:

1. A clutch device for coupling two shafts, more particularly for automobile vehicles with change-speed gears comprising in combination, a multiple disc clutch having a loose disc carrier rotatably supported in relation to both shafts to be coupled together and a second disc carrier fixedly connected to one of said shafts, a supplementary friction clutch adapted to couple said loose disc carrier to one of said shafts, clutch levers distributed round the periphery, a single system of spring means adapted to act upon both said multiple disc clutch and said supplementary clutch through the medium of said clutch levers, and means to strain said spring means.

2. A clutch device for coupling two shafts, more particularly for automobile vehicles with change-speed gears comprising in combination, a multiple disc clutch having a loose disc carrier rotatably supported in relation to both shafts to be coupled together and a second disc carrier fixedly connected to one of said shafts, a supplementary friction clutch adapted to couple said loose disc carrier to one of said shafts, clutch levers mounted on said loose disc carrier, a single system of spring means adapted to act upon both said multiple disc clutch and said supplementary clutch through the medium of said clutch levers, and means to strain said spring means.

3. A clutch device for coupling two shafts, more particularly for automobile vehicles with change-speed gears comprising in combination, a multiple disc clutch having a loose disc carrier rotatably supported in relation to both shafts to be coupled together and a second disc carrier fixedly connected to one of said shafts, a supplementary friction clutch adapted to couple said loose disc carrier to one of said shafts, a pressure plate for said multiple disc clutch, a pressure plate for said supplementary clutch, clutch levers having inner and outer arms, a single system of spring means adapted to act upon both said multiple disc clutch and said supplementary clutch through the medium of said clutch levers, said inner lever arms being adapted to engage said multiple disc clutch pressure plate, said outer lever arms being adapted to engage said supplementary clutch pressure plate, and means to strain said spring means.

4. A clutch device for coupling two shafts, more particularly for automobile vehicles with change-speed gears comprising in combination, a multiple disc clutch having a loose disc carrier rotatably supported in relation to both shafts to be coupled together and a second disc carrier fixedly connected to one of said shafts, a supplementary friction clutch adapted to couple said loose disc carrier to one of said shafts, a pressure plate for said multiple disc clutch, a pressure plate for said supplementary clutch, clutch levers having inner and outer arms, a single system of spring means adapted to act upon both said multiple disc clutch and said supplementary clutch through the medium of said clutch levers, an annular body engaged by said spring means, said inner lever arms being adapted to engage said multiple disc clutch pressure plate, said outer lever arms being adapted to engage said supplementary clutch pressure plate and said annular body, and means to strain said spring means.

5. A clutch device for coupling two shafts, more particularly for automobile vehicles with change-speed gears comprising in combination, a multiple disc clutch having a loose disc carrier rotatably supported in relation to both shafts to be coupled together and a second disc carrier fixedly connected to one of said shafts, a supplementary friction clutch adapted to couple said loose disc carrier to one of said shafts, a pressure plate for said multiple disc clutch, a pressure plate for said supplementary clutch, clutch levers having inner and outer arms, a single system of spring means adapted to act upon both said multiple disc clutch and said supplementary clutch through the medium of said clutch levers, an annular body engaged by said spring means, said inner lever arms being adapted to engage said multiple disc clutch pressure plate, said outer lever arms being adapted to engage said supplementary clutch pressure plate and said annular body, the pivotal axes of said clutch levers being displaceable through a short distance in the direction of the spring action of said spring means in such a way that, in unclutching, said clutch levers at first fulcrum about their point of contact with said supplementary clutch pressure plate, and then, when said pivotal axes have reached the limit of their displaceability, fulcrum about said pivotal axes, and means to compress said spring means.

6. A clutch device as claimed in claim 5, characterized by the feature that the clutch levers are mounted on sliding pieces, which are axially displaceable in guides in said loose disc carrier.

7. A clutch device as claimed in claim 5, characterized by the feature that the distance of displacement of the pivotal axes of the clutch levers is adjustable.

8. A clutch device for coupling two shafts, more particularly for automobile vehicles with change-speed gears comprising in combination, a multiple disc clutch having a loose disc carrier rotatably supported in relation to both shafts to be coupled together and a second disc carrier fixedly connected to one of said shafts, a supplementary friction clutch adapted to couple said loose disc carrier to one of said shafts, a pressure plate for said multiple disc clutch, a pressure plate for said supplementary clutch, clutch levers having inner and outer arms, a single system of spring means adapted to act upon both said multiple disc clutch and said supplementary clutch through the medium of said clutch levers, an annular body engaged by said spring means, said inner lever arms being adapted to engage said multiple disc clutch pressure plate, said outer lever arms being adapted to engage said supplementary clutch pressure plate and said annular body, the engaging points of said clutch levers on said supplementary clutch pressure plate being located between the pivotal axes of said clutch levers and the engaging points of said clutch levers with said annular body, and means to compress said spring means.

9. A clutch device for coupling two shafts, more particularly for automotive vehicles with change-speed gears comprising in combination, a multiple disc clutch having a loose disc carrier rotatably supported in relation to both shafts to be coupled together and a second disc carrier fixedly connected to one of said shafts, a supplementary friction clutch adapted to couple said loose disc carrier to one of said shafts, a pressure plate for said multiple disc clutch, a pressure plate for said supplementary clutch, clutch levers having inner and outer arms, a single system of spring means adapted to act upon both said multiple disc clutch and said supplementary clutch through the medium of said clutch levers, an annular body engaged by said spring means, said inner lever arms being adapted to engage said multiple disc clutch pressure plate, said outer lever arms being adapted to engage said supplementary clutch pressure plate and said annular body, and means to relieve said multiple disc clutch pressure plate from the action of said spring means transmitted to it by said clutch levers, before the pivotal axes of said clutch levers have reached the limit of their displaceability.

10. A clutch device as claimed in claim 9, characterized by the feature that said clutch levers engage said multiple disc clutch pressure plate through the medium of an adjustable screw.

HANS KATTWINKEL.